United States Patent [19]
Pleiss

[11] Patent Number: 6,134,840
[45] Date of Patent: Oct. 24, 2000

[54] VEHICLE DOOR ASSEMBLY HAVING A WINDOW LIFTER WITH MOVABLY MOUNTED GUIDE RAILS

[75] Inventor: Eberhard Pleiss, Untersiemau, Germany

[73] Assignee: Brose Fahrzeugteile GmbH & Co. KG, Coburg, Germany

[21] Appl. No.: 09/236,502

[22] Filed: Jan. 25, 1999

[30] Foreign Application Priority Data

Jan. 23, 1998 [DE] Germany .......................... 198 02 478

[51] Int. Cl.$^7$ ................. B60J 5/04; B60J 1/16
[52] U.S. Cl. ................. 49/502; 49/348; 49/352; 49/374
[58] Field of Search ................. 49/502, 374, 348, 49/349, 352; 296/146.2, 146.5

[56] References Cited

U.S. PATENT DOCUMENTS

| | | | |
|---|---|---|---|
| 4,711,052 | 12/1987 | Maeda et al. | 49/502 |
| 4,937,977 | 7/1990 | Gergoe et al. | 49/352 |
| 4,984,389 | 1/1991 | Benoit et al. | 49/502 |
| 5,033,236 | 7/1991 | Szerdahelyi et al. | 49/502 |
| 5,325,632 | 7/1994 | Djavairian et al. | 49/502 |
| 5,469,668 | 11/1995 | Heim et al. | 49/502 |
| 5,505,024 | 4/1996 | DeRees et al. | 49/503 |
| 5,867,942 | 2/1999 | Kowalski | 49/502 |
| 5,907,897 | 6/1999 | Hisano | 29/434 |
| 5,946,858 | 9/1999 | Staser | 49/352 |
| 5,964,063 | 10/1999 | Hisano et al. | 49/502 |

FOREIGN PATENT DOCUMENTS

| | | |
|---|---|---|
| 0420617 | 5/1994 | European Pat. Off. . |
| 19513850 | 3/1996 | Germany . |
| 19509282 | 11/1996 | Germany . |
| 19511105 | 11/1996 | Germany . |
| 19611074 | 9/1997 | Germany . |
| 6-171366 | 6/1994 | Japan . |

*Primary Examiner*—Daniel P. Stodola
*Assistant Examiner*—Gregory J. Strimbu
*Attorney, Agent, or Firm*—Christie, Parker & Hale, LLP

[57] ABSTRACT

A motor vehicle door with an outside door panel, an inside door panel provided with a large cutout, which can be partially covered by a supporting plate, where the supporting plate bears a Bowden cable tube window lifter and possibly additional functional units, such as a lock, side air bag, electric cables, and an inside door trim panel which completes the door on the side toward the motor vehicle interior. The supporting plate is connected on the side facing the outside door panel to a mounting rail, which partially surrounds the window pane and on which at least one guide rail of the Bowden cable window lifter rests displaceably.

16 Claims, 4 Drawing Sheets

VEHICLE DOOR ASSEMBLY HAVING A WINDOW LIFTER WITH MOVABLY MOUNTED GUIDE RAILS

FIELD OF THE INVENTION

The invention concerns a motor vehicle door with an outside door panel and an inside door panel provided with a large cutout, which can be partially covered by a supporting plate.

BACKGROUND OF THE INVENTION

From DE 196 11 074 A1, a so-called out-side-lying double-strand Bowden cable window lifter is known, whose mechanical displacement system is disposed between the outside door panel and the window pane. The attachment of the guide rails is effected by screw connections to the inside door panel, which is flanged by the outside door panel. Outside-lying window lifters have the advantage that they are very space-efficient and do not reduce the space between the window pane and the inside door trim panel, yielding greater design flexibility for the inside door trim panel. However, it is disadvantageous that the union of the design principle of an outside-lying window lifter with the advantages of a door module consisting of a large number of preassembled and preinspectable functional units on a supporting plate does not seem readily possible.

Some door modules are described in DE 195 09 282 A1 and DE 195 11 105 C1. According to these references, the guide rails of the cable window lifter are connected by suitable attachment points to the supporting plate, which obviously only permits attachment of the window pane in the manner of a so-called inside-lying window lifter, in which the window pane is disposed between the outside door panel and the window lifter. Inevitably the design of the supporting plate cannot be effected without consideration of the requirements of the window pane guidance and, consequently, of the window lifter. The large cutouts provided in the inside door panel are completely covered by the respective supporting plates. In order to attach the window pane to the window lifter after completion of the assembly of the supporting plate, special mounting openings are available in the supporting plate, which may be re-sealed after completion of assembly, for example, by rubber covers.

EP 0 420 617 B1 describes a door window cassette consisting substantially of a window frame and guide channels for the window pane attached to the sides thereof as well as a mounting plate lying between them. Four individual cable guide rollers and a drive unit are mounted directly on the mounting plate. A horizontally running rod is attached by its ends to the vertically running sections of the cable sling guided around the guide rollers. The window pane is connected too the window lifter by means of connection bolts of the rod. Thus, the supporting plate represents an integral component of the window lifter and must, consequently, be precisely adapted to the guidance requirements of the window pane.

SUMMARY OF THE INVENTION

The object of the invention is to improve the generic motor vehicle door such that the use of supporting plates with mechanical and/or electric and/or electronic components mounted thereon is ensured even in connection with cutside-lying window lifters. The invention should have a simple structural design and should render the assembly of the motor vehicle door easier.

According to the present invention, the supporting plate is connected to a mounting rail on the side facing the outside door panel, which rail partially encloses the window pane and rests displaceably on at least one guide rail of a Bowden cable window lifter. Through the use of this simple technical means, a combination of a supporting plate with an outside-lying window lifter is developed, while retaining all the advantages of a fully equippable and preinspectable door module.

According to a first variant of the invention, the mounting rail is implemented as a separate part and connected by its ends with the supporting plate by screws, rivets, welding, or gluing. If various technical requirements imposed on the supporting plate and the mounting rail suggest the use of different materials, of course, nothing stands in the way of that.

A second variant of the invention provides for integration of the mounting rail as a single piece into the supporting plate. The integration of the mounting rail into the supporting plate presents itself in particular if this is implemented as a plastic or cast part, since modern molding and casting techniques enable cost-effective production of even complex parts with high quality. A further advantage of the one-piece embodiment results from the avoidance of tolerance deviations and of an assembly step to connect the two parts.

A mounting rail integrated as one piece with the supporting plate can be achieved on the basis of a sheet metal part if the region of the guide rail is stamped out retaining its edge connections with the supporting plate and developed by deep drawing in the direction of the wet zone side of the vehicle door.

Integration of the cable drum housing into the mounting rail, whereby a reduction in components is achieved, as well as attachment of the drive unit to the mounting rail, also seems advantageous. Moreover, preassembly of the entire window lifter system onto the mounting rail may be provided, if a separate mounting rail to be connected to the supporting plate is used.

To simplify the assembly of the functional components which are to be attached in the door body, these components should also rest displaceably on the mounting rail. This can be implemented in particular in that the functional components (e.g., door lock and outside handle) are connected with the displaceable guide rails of the window lifter or—in the case of a two-strand Bowden cable window lifter for a driver or passenger door—with the center pillar guide rail. Thus, the positioning of the guide rail simultaneously effects the positioning of the functional components connected to it. These connections may, for example, be made by brackets which are attached or molded on the corresponding components.

Another preferred variant of the invention provides that with the use of a two-strand Bowden cable window lifter, the drive unit including the cable drum is disposed outside the intermediate zone between the guide rails. Moreover, the guide rail facing the drive unit has in the cable zones one cable outlet which faces the drive unit and one cable outlet that faces the other guide rail. Such a design ensures that the displaceable guide rails can be displaced without problems from their transport position into the operating position without having to also move the window lifter drive or having to insert electrical plugs between the motor and/or an electrical control device. Thus, comprehensive preinspectability of the door module is guaranteed and the risk of defects reduced.

DESCRIPTION OF THE DRAWINGS

In the following the invention is explained in detail with reference to an exemplary embodiment and the figures presented.

DETAILED DESCRIPTION OF THE INVENTION

Figure 3:
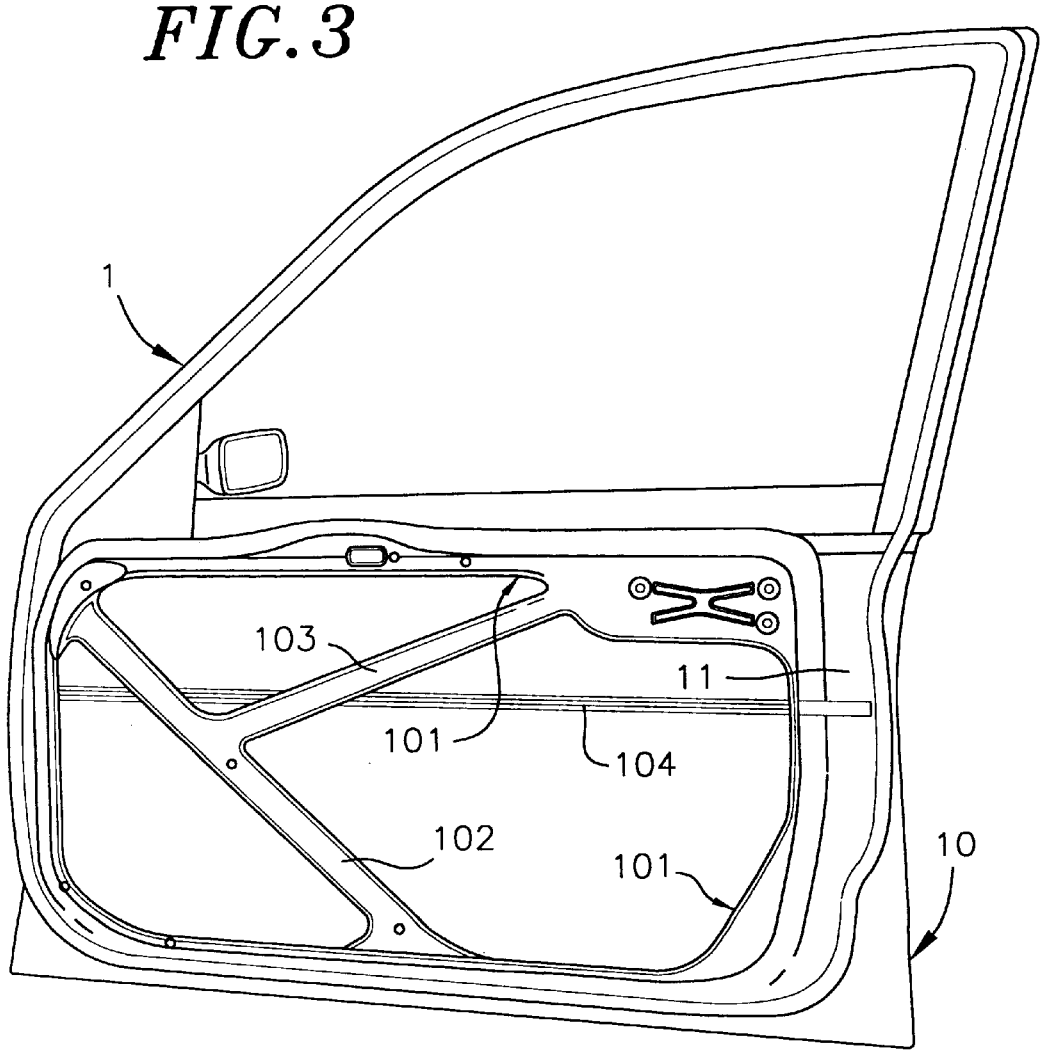
FIG. 3 is a view of the door body with a large cutout in the inside door panel to be equipped with a door module according to FIG. 1.
Figure 4:
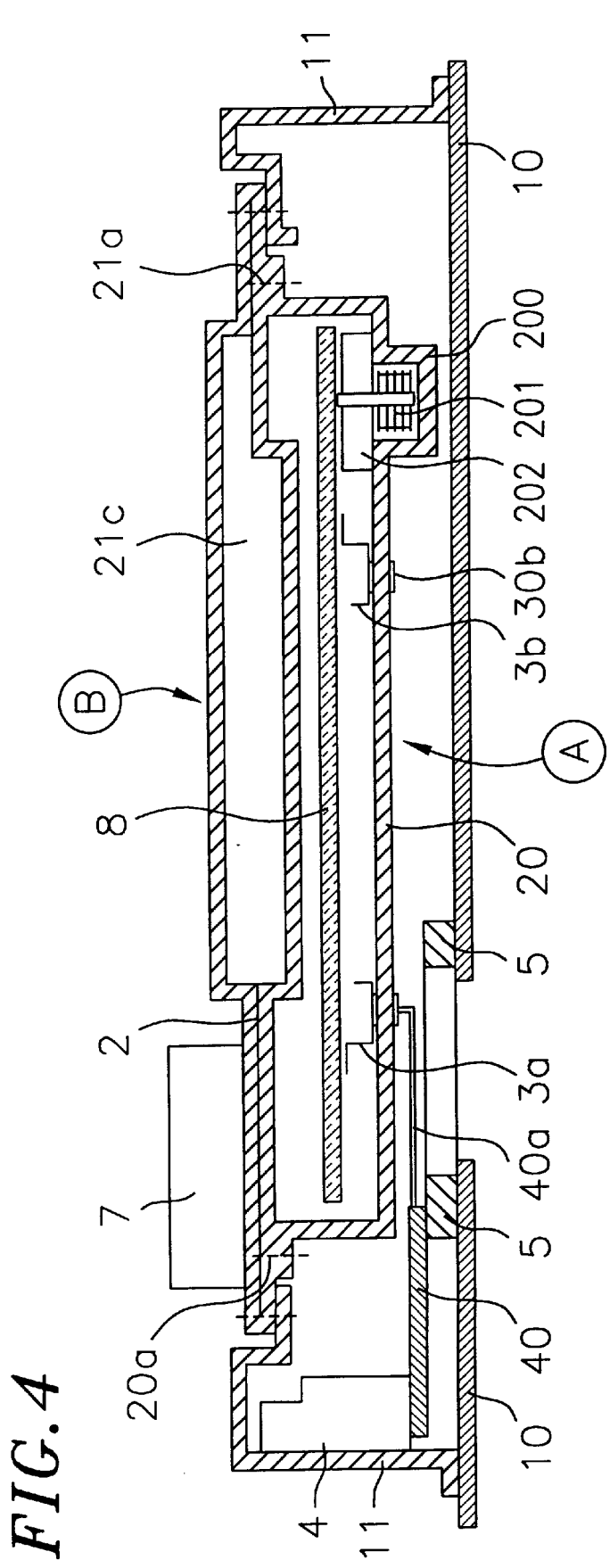
FIG. 4 idealized schematic cross-section of motor vehicle door equipped with a module having a support: plate and mounting rail formed as a single piece.

The door body 1 depicted in FIG. 3 has a large cutout 101 in the inside door panel 11, which is traversed by braces 102, 103 to increase the rigidity of the door body 1. An additional reinforcement element 104 serves as side impact protection. The large cutout 101 is particularly well-suited for completing the motor vehicle door with a so-called door module, whose supporting plate 2 at least partially covers the cutout 101 and which bears significant functional components.

Figure 1:
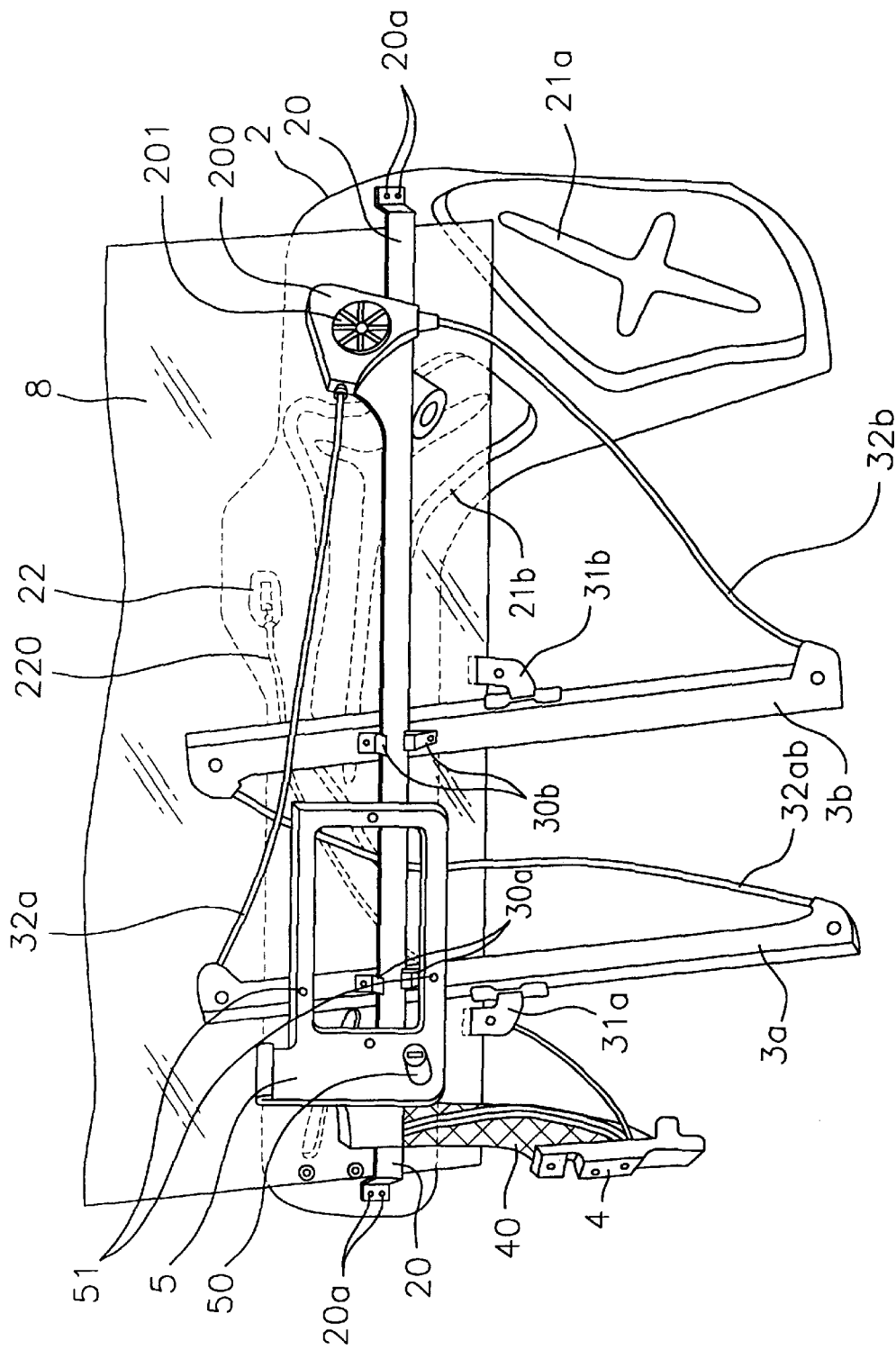
FIG. 1 is a side view of the wet zone side of a supporting plate with preassembled functional components before its incorporation into the door body.

FIG. 1 depicts such a door module, which is equipped among other things with an outside-lying two-strand Bowden cable window lifter and a lock 4 with lock cylinder 50, i.e., disposed between the window pane 8 and outside door panel 10. By means of the idealized schematic cross-section in FIG. 2, which cuts through all significant components of the door module regardless of their actual position in the vehicle door, it is possible to obtain a better understanding with regard to the structure according to the invention.

Figure 2:
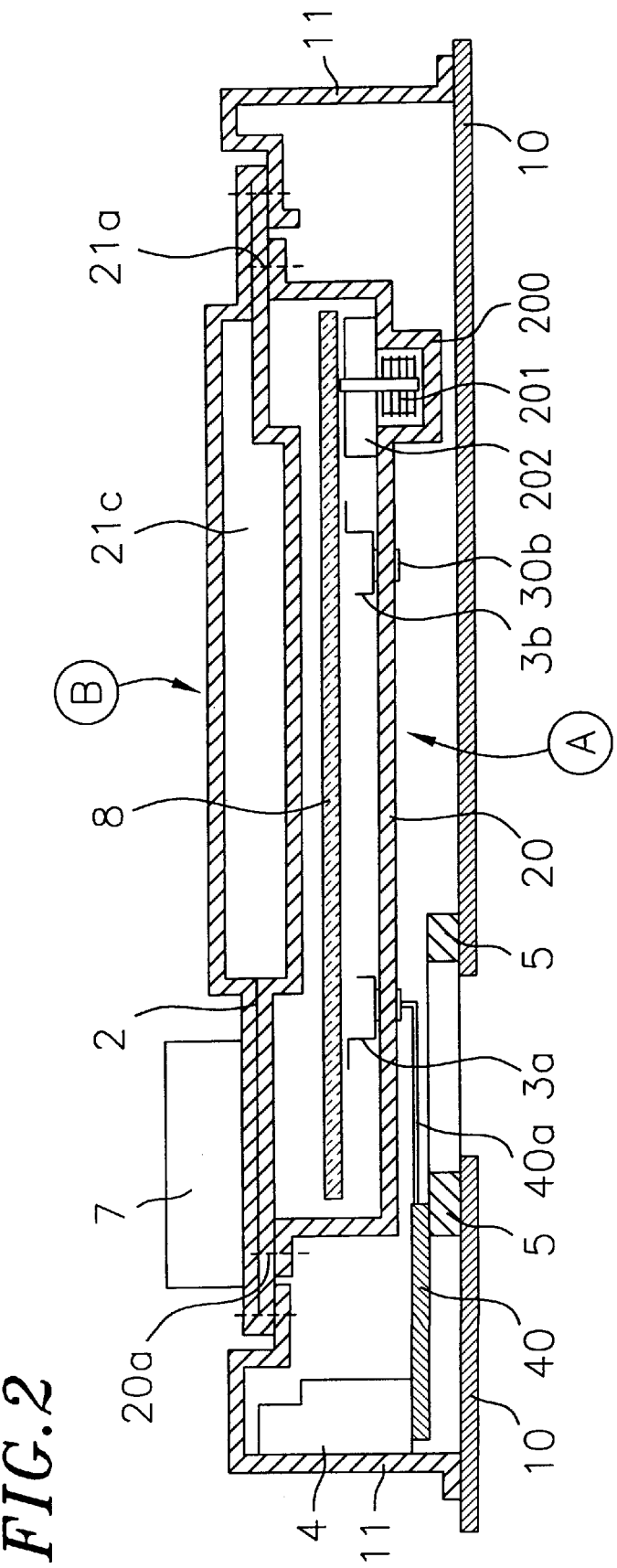
FIG. 2 is an idealized schematic cross-section of a motor vehicle door equipped with a module according to FIG. 1.

A mounting rail 20 running substantially horizontally and parallel to the supporting plate 2 or to the outside door panel 10 partially encloses the window pane 8 on the wet zone side A and is solidly connected by its ends via the attachment points 20a with the supporting plate 2. The guide rails 3a, 3b of the two-strand cable window lifter rest displaceably on the mounting rail 20 by means of the retainer element 30a, 33b, whereby one guide rail 3a is connected with the lock 4 and with the outside door handle 5. The depiction of FIG. 2 shows the functional position of the window lifter and lock 4. In the transport and assembly position (not shown), the guide rails 3a, 3b and the functional components connected therewith (lock 4, lock cylinder 50, and outside door handle 5) are shifted far enough in the direction of the drive unit 202 that problem-free insertion of the window lifter and the lock 4 is possible. Only after the supporting plate 2 has been attached to the inside door panel 11 is the guide rail 3a shifted with the lock 4 into the operating position, such that the lock 4 may be attached at the position provided on the door body.

The connection between the guide rail 3a and the lock 4 may be implemented in various ways. Thus, for example, as shown in FIG. 1, the lock 4 may be attached to the outside door handle 5 by means of a lock bracket 40, which handle is, for its part, mounted on the guide rail 3a by means of the attachment points 51. However, on the other hand, it is also possible to attach the lock 4 by means of its lock bracket 40 directly, or as shown in FIG. 2, to attach the unit consisting of the lock 4 and the outside door handle 5 to the guide rail by means of an additional bracket 40a.

The retainer elements 30a, 33b depicted in FIG. 1 serve only to describe the design principle of the invention; in principle, any connection may be used between the mounting rail 20 and at least one guide rail 3a, 3b, which represents a displaceable mounting such that the guide rail 3a, 3b in question can be shifted from a transport or assembly position into the operating position. Slide rails, into which adjustable guide elements of the guide rails 3a, 3b engage, incorporated into the mounting rail 20, are also appropriate for this.

If the mounting rail 20 is to be implemented as a cast or molded part, at least the cable drum housing 200, in which the cable drum 201 rests, can be integrated as one piece into the mounting rail 20. Thus, it is possible to do without a separate cable drum housing. In particular, if the necessary displacement path between the transport/assembly position and the operating position of the guide rails 3a, 3b of the two-cable Bowden cable window lifter is relatively long, the drive unit 202 should be disposed with the cable roller 201 outside the intermediate space between the guide rails 3a, 3b, advantageously disposed on the side of the supporting plate 2 facing away from the lock 4.

To minimize bending in the Bowden cables and thus to minimize friction losses, the cable outlets are pointed in opposite directions in the guide regions of the guide rail 3b, whereby the cable outlet connected by the Bowden cable 32b to the cable drum 201 faces the drive unit, whereas the other cable outlet faces the guide rail 3a, and is in direct connection with the lower cable outlet via the Bowden cable 32ab. By means of the Bowden cable 32a between the upper cable outlet of the guide rail 3a and the cable drum 201, the cable sling and thus the flow of force in the window lifter is completed.

Carriers 31a, 31a, which are solidly connected with the cable sling and are raised or lowered along the guide rails 3a, 3b upon actuation of the window lifter, are provided on each guide rail 3a, 3b for the attachment of the window pane 8.

The supporting plate 2 selected for the exemplary embodiment is a two-walled plastic part which was produced by blow molding technology. For reinforcement of the supporting plate 2, reinforcement zones 21a, 21a, in which the two walls are connected to each other, are provided. One or a plurality of cavities 21c may be used to install mechanical or electrical components, such as electric cables, or to guide cables and linkages. Moreover, a closed cavity may also function as a resonance space for a speaker.

A door handle plate 22, in which the door opener is mounted, is integrated into the upper region of the supporting plate 2; the actuation force is forwarded to the lock 4 via the Bowden cable 220.

On the dry zone side B, the supporting plate 2 carries a side air bag 7, which deploys when needed through a breaking point (not depicted) in the inside door trim panel.

Since the supporting plate 2 only partially covers the cutout 101 in the inside door panel 11, to separate the wet zone A and the dry zone B, it is necessary to cover at least the area remaining open by suitable means. This may be accomplished, for example, by gluing on an appropriately tailored film.

What is claimed is:

1. A motor vehicle door comprising:

an outside door panel;

an inside door panel provided with a cutout;

a support plate partially covering the cutout and having a side facing the outside door panel;

a bowden cable window lifter having at least one guide rail carried by the support plate;

a mounting rail connected to the support plate and extending substantially horizontally and parallel to the support plate, the mounting rail located between the outside door panel and the side of the support plate facing the outside door panel;

a window pane located between the support plate and the mounting rail;

wherein the guide rail of the bowden cable window lifter is movable on the mounting rail along a length of the mounting rail substantially parallel to the support plate between a first position and a second position.

2. The motor vehicle door according to claim 1, wherein the mounting rail has two ends and is connected by the ends to the support plate.

3. The motor vehicle door according to claim 2 wherein the mounting rail is connected to the support plate by one of screws, rivets, welding, and gluing.

4. The motor vehicle door according to claim 1, wherein the mounting rail and the support plate are formed as a single piece.

5. The motor vehicle door according to claim 4, wherein the single piece is a cast part.

6. The motor vehicle door according to claim 4, wherein the single piece is a sheet metal part and the mounting rail is stamped.

7. The motor vehicle door according to claim 4, wherein the support plate and the mounting rail are molded plastic.

8. The motor vehicle door according to claim 1, wherein the guide rail is connected with at least one of an outside door handle and a door lock.

9. The motor vehicle door according to claim 8, wherein the door lock is connected to the outside door handle, and the outside door handle is attached to the guide rail.

10. The motor vehicle door according to claim 8, wherein the door lock and the outside door handle are attached to the guide rail by a single bracket.

11. The motor vehicle door according to claim 1, wherein the window lifter includes a drive unit and a cable drum housing, wherein the cable drum housing is monolithically formed with the mounting rail.

12. The motor vehicle door according to claim 1, further comprising at least one of a door lock, electric cables and an air bag carried by the support plate.

13. The motor vehicle door according to claim 12 wherein, in the first position, the guide rail facilitates installation of the window lifter through the cutout.

14. The motor vehicle door according to claim 1, the window lifter further comprising a drive unit supported by the mounting rail, said at least one guide rail comprising a first guide rail and a second guide rail, wherein the bowden cable window lifter is a two-strand bowden cable window lifter, wherein the drive unit contains a cable drum and is disposed outside an intermediate zone between the first and second guide rails and further wherein the second guide rail includes a first end guide zone and a second end guide zone, the first end guide zone having a cable outlet which faces the drive unit and the second end guide zone having a cable outlet which faces the first guide rail.

15. The motor vehicle door according to claim 1 wherein the guide rail is slidable on the mounting rail between the first and the second positions.

16. A motor vehicle door comprising:

an outside door panel;

an inside door panel provided with a cutout;

a support plate partially covering the cutout and having a side facing the outside door panel;

a bowden cable window lifter having at least one guide rail carried by the support plate;

a mounting rail connected to the support plate and extending substantially horizontally and parallel to the support plate, the mounting rail located between the outside door panel and the side of the support plate facing the outside door panel;

a window pane located between the support plate and the mounting rail;

wherein the bowden cable window lifter is located between the window pane and the outside door panel, and the guide rail of the bowden cable window lifter is movable on the mounting rail along a length of the mounting rail substantially parallel to the support plate between a first position and a second position.

* * * * *